United States Patent
Gruhler et al.

(10) Patent No.: US 8,252,079 B2
(45) Date of Patent: Aug. 28, 2012

(54) PARTICLE SEPARATING DEVICE FOR AN AEROSOL STREAM

(75) Inventors: Tobias Gruhler, Pfullingen (DE);
Gabriele Gorbach, Reutlingen (DE);
Klaus Bendl, Oberderdingen (DE);
Thomas Haas, Dettingen (DE)

(73) Assignee: ElringKlinger AG, Dettingen (DE)

( * ) Notice: Subject to any disclaimer, the term of this patent is extended or adjusted under 35 U.S.C. 154(b) by 44 days.

(21) Appl. No.: 12/931,112

(22) Filed: Jan. 25, 2011

(65) Prior Publication Data

US 2011/0179755 A1   Jul. 28, 2011

Related U.S. Application Data (63) Continuation of application No. PCT/EP2009/005596, filed on Aug. 1, 2009.

(30) Foreign Application Priority Data

Aug. 11, 2008 (DE) .................. 20 2008 011 001 U
Oct. 1, 2008 (DE) ..................... 10 2008 050 038
Oct. 1, 2008 (DE) ..................... 10 2008 050 039

(51) Int. Cl.
*B01D 45/08* (2006.01)
*F01M 11/08* (2006.01)
*F02F 7/00* (2006.01)

(52) U.S. Cl. ................. 55/320; 55/490; 55/491; 55/495; 55/DIG. 19

(58) Field of Classification Search .............. 55/318, 55/320, 490, 491, 495, 497, 499, DIG. 19
See application file for complete search history.

(56) References Cited

U.S. PATENT DOCUMENTS

| | | | |
|---|---|---|---|
| 2,182,501 A | 12/1939 | Quave et al. | 55/491 |
| 2,637,540 A | 5/1953 | Rowe | 261/94 |
| 2,850,269 A | 9/1958 | Bohanon | 261/97 |
| 3,075,750 A | 1/1963 | Goettl | 261/97 |
| 3,280,984 A | 10/1966 | Sexton et al. | 210/485 |
| 4,493,718 A | 1/1985 | Schweizer | 55/491 |
| 4,627,406 A | 12/1986 | Namiki et al. | 123/573 |
| 4,693,048 A | 9/1987 | Guetersloh | 52/664 |
| 6,247,463 B1 * | 6/2001 | Fedorowicz et al. | 123/572 |
| 6,290,738 B1 | 9/2001 | Holm | 55/309 |
| 6,302,933 B1 | 10/2001 | Krause et al. | 55/350.1 |
| 6,478,018 B2 * | 11/2002 | Fedorowicz et al. | 123/572 |
| 6,478,019 B2 * | 11/2002 | Fedorowicz et al. | 123/572 |

(Continued)

FOREIGN PATENT DOCUMENTS

DE     1 536 802     2/1970

(Continued)

*Primary Examiner* — Robert A Hopkins
*Assistant Examiner* — Sonji Turner (57) ABSTRACT

Separating device for separating liquid or solid particles from an aerosol stream, comprising an impactor with a perforated plate against which the stream flows, and an impact plate arranged at a short distance behind the perforated plate, the side of the impact plate against which the stream flows having a separating layer with an open structure; in order that the separating device will have a consistently good separating effect during operation, the perforated plate is provided on its rear side with a plurality of spacer elements bearing against the region of the separating layer against which the stream flows, the height of the spacer elements, the support surfaces formed by the spacer elements for the separating layer, and the number and arrangement of the spacer elements being selected in dependence upon the material of the separating layer such that it is ensured that the holes of the perforated plate remain free from material of the separating layer also during operation.

24 Claims, 6 Drawing Sheets

U.S. PATENT DOCUMENTS

| | | | |
|---|---|---|---|
| 8,042,529 B2 * | 10/2011 | Meinig et al. | 123/572 |
| 2001/0015131 A1 | 8/2001 | Angermann et al. | 95/90 |
| 2005/0092267 A1 | 5/2005 | Nonaka et al. | 123/41.86 |
| 2006/0254566 A1 | 11/2006 | Yasuhara | 123/572 |
| 2007/0181108 A1 | 8/2007 | Shieh | 123/572 |
| 2008/0155949 A1 | 7/2008 | Dunsch et al. | 55/456 |
| 2008/0314248 A1 | 12/2008 | Peteln | 96/1 |
| 2009/0199826 A1 | 8/2009 | Meinig et al. | 123/573 |
| 2009/0250044 A1 | 10/2009 | Braunn et al. | 123/573 |

FOREIGN PATENT DOCUMENTS

| | | |
|---|---|---|
| DE | 42 21 885 | 1/1994 |
| DE | 198 03 094 | 8/1999 |
| DE | 10 2006 021 605 | 11/2006 |
| DE | 20 2005 009 990 | 12/2006 |
| EP | 1 068 890 | 1/2001 |
| EP | 1 116 617 | 7/2001 |
| EP | 1 524 414 | 4/2005 |
| JP | 09 291810 | 11/1997 |
| JP | 2000 045750 A | 2/2000 |
| WO | WO 02/21104 | 3/2002 |
| WO | WO 2007/028176 | 3/2007 |
| WO | WO 2007/028351 | 3/2007 |
| WO | WO 2007/137916 | 12/2007 |

* cited by examiner

PARTICLE SEPARATING DEVICE FOR AN AEROSOL STREAM

This application is a continuation of International application No. PCT/EP2009/005596 filed on Aug. 1, 2009, which claims priority of German utility model application No. 20 2008 011 001.7 filed Aug. 11, 2008; German patent application No. 10 2008 050 038.0 filed Oct. 1, 2008; and German patent application No. 10 2008 050 039.9 filed Oct. 1, 2008.

The invention relates to a separating device for separating liquid and/or solid particles from an aerosol stream, comprising an impactor, which has a perforated plate adapted for the aerosol to flow against it, and an impact surface which extends approximately parallel to the perforated plate and is arranged at a distance behind the perforated plate in the flow direction of the perforated plate, the impact surface comprising a separating layer that faces the perforated plate and has an open structure. In the separating device to which the invention relates, the impact surface is formed, in particular, by an impact plate, which is provided with the separating layer on its side that faces the perforated plate.

Since an aerosol stream is a gas stream which entrains the liquid and/or solid particles, a gas stream will be partly referred to hereinbelow, and this term is then to be understood as both the not yet cleaned gas stream and the partially cleaned gas stream as well as the completely cleaned gas stream.

In particular, the invention relates to such a separating device for separating fine and very fine liquid droplets from a gas stream, and a particularly important field of application of the invention is such a separating device for separating engine oil droplets from blow-by gases, which are returned from the crankcase of an internal combustion reciprocating piston engine to its combustion chambers.

The invention will, therefore, be explained hereinbelow with reference to preferred embodiments of the invention, which relate to oil mist separating devices which, in particular, are integrated into a valve cover of the engine.

During operation of an internal combustion reciprocating piston engine, it is unavoidable that gases from the cylinders entraining a mist of very fine engine oil droplets will get into the space accommodating the crankshaft and have to be discharged from it. For environmental reasons, these so-called blow-by gases are returned via the intake system of the engine to its combustion chambers after the oil mist has been separated off from the gas stream.

An oil mist separating device serving this purpose is disclosed in WO 2007/137916-A. In this known construction, the camshaft rotatably mounted in a cylinder head of the engine is configured as a hollow shaft, and the blow-by gases laden with the oil mist are first introduced into the hollow space of the camshaft, which forms a first stage of the oil mist separating device. The blow-by gases freed from part of the engine oil then pass into an oil mist post-separator, which forms a second stage of the oil mist separating device and is stationarily attached to a side wall of the cylinder head. This oil mist post-separator, which is a separating device of the kind mentioned at the outset, has a substantially parallelepipedal, upright housing, which encloses a chamber which is divided by an inclined (almost diagonal) partition wall into an inlet chamber region and an outlet chamber region. The blow-by gases to be cleaned (referred to hereinbelow as raw gas) are introduced at the top into the inlet chamber region, more particularly, with a flow direction approximately parallel to the plane defined by the partition wall. Approximately the upper half of the partition wall is provided with holes for passage of the raw gas, and the jets of raw gas produced by these holes then impinge on an impact wall extending parallel to the partition wall, arranged at a distance from the partition wall, projecting from above into the outlet chamber region and terminating at a considerable distance from a chamber bottom formed by the housing. The inflow side of the impact wall is covered with a non-woven material. On the outflow side of the partition wall, oil droplets are separated off from the raw gas by the impact wall provided with the non-woven material and drip onto the chamber bottom, which is provided in the outlet chamber region with an oil discharge opening. The raw gas that is thereby at least partially freed from the oil mist (referred to hereinbelow as clean gas) flows out of the outlet chamber region at the top, more particularly, through a tubular clean gas outlet arranged at the top of the housing and orientated in the vertical direction. In the inlet chamber region, the chamber or housing bottom is not provided with an oil discharge opening, although oil droplets are unavoidably also separated off from the raw gas impinging on the inflow side of the partition wall, albeit to a small extent. The raw gas entering the outlet chamber region at a relatively high flow velocity through the holes of the partition wall is deflected downwards in the direction towards the housing bottom by the impact wall and after deflection again then flows to the clean gas outlet.

In this known separating device forming the oil mist post-separator, the impact wall located downstream from the partition wall provided with holes is formed on the upper housing wall, while the partition wall is configured as a separately produced part and appears to be held in the housing by means that are not disclosed (see FIG. 3). Since WO 2007/137916-A discloses no holding means for the non-woven material attached to the impact wall, it must be concluded from FIG. 3 that this non-woven material is adhesively bonded to the impact wall. For all these reasons, production of this known separating device is relatively complicated and costly, and, in addition, it seems impossible to exchange or renew the non-woven material with justifiable expenditure should it have become clogged by retained impurities during operation or have undergone such change in its structure required for operation that the gas jets generated by the holes of the partition wall impinge on the non-woven material at a relatively high velocity.

In this known separating device forming the oil mist post-separator, the impact wall which is located downstream from the partition wall provided with holes and is covered with the non-woven material is at a considerable distance from the partition wall provided with holes, which, depending on the size of this distance, may negatively affect the separating effect. In this connection it is also to be noted that, in particular, when a non-woven fibrous material is used as separating layer the distance of the separating layer from the partition wall provided with holes may change during operation, more particularly, in dependence upon the momentary flow velocity of the gas jets impinging on the separating layer. Depending on the material of the separating layer, its thickness may possibly change during operation of the separating device, for example, on account of temperature influences, but, above all, when a non-woven fibrous material is used for the separating layer, more particularly, inter alia, on account of the strong turbulences occurring in the gas jets when the gas jets impinge on the separating layer.

The object underlying the invention was to propose a separating device of the kind defined at the outset, which has an at least almost consistently good separating effect during operation.

In accordance with the invention, this object is accomplished by a separating device of the kind defined at the 
outset, which is characterized by the perforated plate being provided on its side facing the impact surface or impact plate with a plurality of spacer elements bearing against the region, against which the aerosol stream flows, of the side of the separating layer facing the perforated plate, the height of the spacer elements measured in the flow direction, the support surfaces formed by the spacer elements for the separating layer, and the number and arrangement of the spacer elements being selected in dependence upon the material of the separating layer such that it is ensured that the holes of the perforated plate remain free from material of the separating layer also during operation of the separating device, even when the separating layer of the separating device that has been not yet been put into operation is at a short distance from the perforated plate, which is favorable for obtaining a good separating effect.

In a separating device in accordance with the invention, the impact surface or impact plate can be arranged at a small distance from the perforated plate which is optimal for the separating effect, without any risk—not even when a non-woven fibrous material is used for the separating layer—that the generation of gas jets by the perforated plate, which are essential for the separating effect, will be impaired by the separating layer coming too close to the holes of the perforated plate—and be it in the course of operation of the separating device—or even by material of the separating layer entering these holes. The desired distance between the material of the separating layer and the holes of the perforated plate can be defined and permanently maintained by the number and/or the spatial arrangement and/or the dimensioning of the spacer elements (in the direction perpendicular to the perforated plate).

An open structure of the separating layer is to be understood as any structure of the separating layer at its side that faces the perforated plate and against which the gas jets flow during operation of the separating device, which results in a rough, fissured or porous surface of the separating layer, which prevents the particles entrained by the aerosol from being carried along for the most part by the gas stream deflected by the impact plate in such a way that they are dispersed in the gas stream. In addition, the open structure of the separating layer, in the case of particles formed by liquid droplets, also results in a certain coalescence effect, owing to which fine and very fine droplets coalesce to larger droplets, whereby the separating effect is improved.

The impact surface or impact plate of the separating device in accordance with the invention could be gas-permeable to a slight extent for the gas stream, but embodiments are preferred, in which the impact plate or impact surface is gas-impermeable or at least substantially gas-impermeable in the flow direction of the aerosol stream, at least in its region lying in this direction behind the separating-effective region of the separating layer, i.e., in preferred embodiments of the separating device in accordance with the invention, the gas stream does not flow through the impact plate located downstream from the perforated plate; rather particles from the aerosol stream are also separated off at the impact surface or impact plate provided with the separating layer, and, in the case of separated liquid droplets, these drip from the impact surface or impact plate and the separating layer, a procedure which is further promoted by the gas jets emerging from the perforated plate being deflected by the impact surface or impact plate such that after the deflection they run downwards more or less parallel to the impact surface.

U.S. Pat. No. 4,627,406 discloses an oil mist separator with a casing in which there are arranged in inflow direction of the blow-by gases behind one another perforated plates and dimensionally stable filter plates through which the gas stream also flows, for example, porous metallic filter plates. The perforated plates and filter plates engage with plate edges in grooves provided on the housing and are thereby held, in some embodiments, at prescribed distances from one another, whereas in other embodiments, a perforated plate and a filter plate associated with it lie with surface-to-surface contact against each other. In an embodiment in which a perforated plate and a filter plate associated with it extend in spaced relation to each other, the perforated plate is provided in the region of its corners with support elements projecting in the direction towards the associated filter plate, which lie with surface-to-surface contact against the corresponding corner regions of the filter plate, these corner regions being covered by the side walls of the grooves provided for this pair of plates on the housing and, consequently, not being impinged on at all by the aerosol stream. This is in contrast to the feature of the separating device in accordance with the invention, according to which the spacer elements are distributed more or less uniformly over the region of the separating layer against which the aerosol stream flows. Moreover, in view of features to be explained hereinbelow of preferred embodiments of the separating device in accordance with invention it is pointed out that in the oil mist separator disclosed in U.S. Pat. No. 4,627,406, more particularly, in all its embodiments, the perforated plates and the filter plates are installed as separate elements in the housing, i.e., a perforated plate and a filter plate are never connected to each other as an assembly group for installation as a unit in the housing.

In preferred embodiments of the separating device in accordance with the invention, the separating layer consists of such a material that it is compressible and, in particular elastic, i.e., elastic in its thickness, transversely to the impact surface or impact plate. In combination with the spacer elements provided in accordance with the invention, this has the following advantages:

The separating layer can be produced with relatively large tolerances with respect to its thickness as it can be reduced in its thickness by the spacer elements of the perforated plate when being installed between the perforated plate and the impact plate (the initial thickness of the separating layer only must not be smaller than the distance of the spacer elements of the perforated plate from the impact plate), and the separating layer can also sink somewhat during operation of the separating device (i.e., its thickness in the uncompressed state can then be somewhat less than in the new state of the separating layer), without the distance of the separating layer from the perforated layer that is prescribed by the spacer elements of the perforated plate becoming larger than an optimum separating effect requires.

The material of the separating layer may, for example, be a foamed, open-pored and, in particular, elastic plastic material, but, in principle, also, for example, a porous, ceramic or metallic material with open pores at its surface, even if this is not preferred. It is particularly advantageous for the separating layer to have on its side on which the flow impinges a non-woven fibrous material or to consist entirely of a non-woven fibrous material, in particular, of plastic fibers that are chemically resistant to engine oil and blow-by gases.

In preferred embodiments of the separating device in accordance with the invention, at least one spacer element is configured as a pin, spike or web projecting from the perforated plate, with webs or ribs that extend over the entire length or width of at least the region of the separating layer on which the flow impinges being preferred. It is highly recommended to provide the perforated plate on its side that faces the impact surface or impact plate with ribs forming spacer elements and having holes of the perforated plate arranged between them. The ribs between the holes are preferably of undulating configuration if the perforated plate is to be provided with as many holes as possible and with as many and long ribs as possible so as to be able to support all regions of the separating layer with the ribs as far as possible. The ribs acting as spacer elements may, however, alternatively or additionally also have the effect of directing the gas stream and/or the movement of the separated particles—if the separated particles are to be directed, it is advantageous for the ribs, during operation of the separating device, to extend approximately vertically or to form an acute angle with the vertical.

It should also be noted that the ribs do not necessarily have to extend continuously over the entire perforated plate, but may be interrupted or may be formed by short rib segments.

In order that the separating device in accordance with the invention can be produced and, where necessary, exchanged particularly cost-effectively, the separating layer in preferred embodiments is in the form of a covering, produced as a separate part, on the impact plate.

Owing to the fact that a defined distance can be maintained between the perforated plate and the separating layer provided on the impact plate by the spacer elements provided in accordance with the invention, the separating device in accordance with the invention can be so configured that the separating layer is held by the spacer elements at such a distance from the perforated plate that flow paths for the gas stream result between the perforated plate and the separating layer, which run approximately parallel to the perforated plate. There then results in the separating device in accordance with the invention a defined bypass volume flow of the gas stream between the perforated plate and the separating layer, which may prove advantageous if the separating layer has become more or less gas-impermeable owing to soiling or some other change that has occurred during operation.

In order to achieve simple and cost-effective production and exchange of the separating device in accordance with the invention, it is advantageous to only insert the separating layer between the perforated plate and the impact surface or impact plate.

In order to then prevent the separating layer from becoming displaced during operation of the separating device, in particular, in the flow-through direction of the flow paths mentioned above, the impactor of preferred embodiments comprises for the separating layer a support for an edge of the separating layer, which prevents such displacement, the support advantageously being gas-permeable in the flow-through direction of the flow paths so as not to impede the mentioned bypass volume flow.

If the separating layer is only inserted, it is advantageous, in addition to the mentioned support for the separating layer or as an alternative to this support, for the perforated plate and/or the impact surface or impact plate to be provided with at least one fixing element for the separating layer. Such fixing elements can be simply formed, in particular, injection-molded, on the plates in the course of their production, and the separating layer does then not have to be adhesively bonded to the impact surface or impact plate. The fixing element can, for example, be formed by a frame-shaped web which is formed on the respective plate and may have interruptions. However, embodiments are simpler, in which the fixing element is configured as a projection protruding from the plate and penetrating into the separating layer if the separating layer allows the projection to penetrate, as is the case, for example, with a foamed plastic or a non-woven fibrous material. Here "penetration" is also to be understood as the projection only deforming the surface of the separating layer that faces it, i.e., forming a depression in the separating layer. If, however, the projection is configured as a short, and, in particular, sharp pin or spike, it may also penetrate between the fibers of a non-woven fibrous material into the interior of the non-woven material.

In order that the separating device in accordance with the invention, possibly also a housing receiving the separating device, can be produced particularly cost-effectively, preferred embodiments of the separating device in accordance with the invention are characterized by the perforated plate and the impact plate being configured as parts produced separately from each other and connected to each other by connecting means to form an assembly group for installation as a unit. Perforated plate and impact plate can then be produced with simple tools (for example, plastic injection-molding tools), then connected to each other to form an assembly group after the separating layer has been placed on the impact plate and, finally, installed, like a valve cover, in a housing. The design of perforated plate and impact plate is then not subject to any production-related restrictions at all, such as have to be taken into consideration in the separating device in accordance with WO 2007/137916-A. In preferred embodiments of the separating device in accordance with the invention, the connecting means are configured as latching elements arranged on the two plates in order that perforated plate and impact plate are particularly easily connectable to each other to form an assembly group which can be handled as a unit.

In principle, perforated plate and impact plate could extend more or less horizontally in the installed state, as is the case, for example, in the separating device in accordance with JP-2000045750-A. However, embodiments are preferred, in which the assembly group is configured for such installation that the plates extend in the vertical direction or form an acute angle with the vertical because separated-off liquid droplets then drip down from the impact plate and the separating layer and the risk is reduced that separated particles will be carried along again to a considerable extent by the gas stream. In this case, it is then also advantageous for the perforated plate to project downwards beyond the impact plate as the gas stream deflected by the impact plate can then flow down past the lower edge of the impact plate in a direction from the assembly group in accordance with the invention, which extends transversely, i.e., approximately perpendicularly to the perforated plate or impact plate.

The perforated plate and the impact plate could be firmly connected to each other, for example, by adhesive bonding, welding or the like. However, with regard to assembly of the assembly group in accordance with the invention, it is easier and more cost-effective for the perforated plate and the impact plate to be connected to each other by latching elements which are provided on the two plates and are so configured that they interact when the two plates are fitted together.

In order to hold perforated plate and impact plate in the assembly group in accordance with the invention at a distance from each other which is optimum for the separating effect, more particularly, even before installation of the assembly group in accordance with the invention in a housing or the like, embodiments of the separating device in accordance with the invention are recommended, in which there is provided on the impact plate and/or on the perforated plate at least one spacer which interacts with the respective other plate and holds the two plates at a distance from each other. In this case, the configuration of the separating device in accordance with the invention is particularly simple if the connecting means serving to connect perforated plate and impact plate to each other also form the at least one spacer, which, for example, is very simple to implement in the case of a latching connection.

When perforated plate and impact plate extend at least approximately in the vertical direction in the installed separating device, and when, for reasons of stability of the assembly group in accordance with the invention, the plates are also to be connected to each other in their lower regions, it is proposed that the connecting means be so configured that the gas stream of the aerosol can flow, in particular, downwards out of the space between perforated plate and impact plate, for example, by connecting means provided in the lower regions of the two plates leaving a gap between them.

When, as is the case in preferred embodiments of the separating device in accordance with the invention, the perforated plate and/or the impact plate have lateral guiding and retaining edges for inserting the assembly group into guides of a housing part of a housing serving to receive the separating device, installation of the assembly group in accordance with the invention on such a housing part is particularly easy, and since the two plates of the assembly group in accordance with the invention can be connected to each other before this, all that is needed is to insert one of the two plates or both plates into guides of the said housing part in order to attach the assembly group in accordance with the invention to this housing part. If the perforated plate also has an upper and possibly also a lower retaining edge for engagement between holding elements of one or more housing parts, the perforated plate can then divide a housing chamber receiving the separating device into an inflow chamber region and an outflow chamber region, more particularly, in an almost gas-tight manner when edges of the perforated plate and housing regions interacting with these together form labyrinth seals. However, one or more edges of the perforated plate can also be adhesively bonded or welded to one or more housing parts.

Owing to the labyrinth seals mentioned above, it is sufficient, if at all necessary, to connect the assembly group in accordance with the invention only along one edge of one of its plates and preferably along the lower edge of the perforated plate to a housing part of a housing serving to receive the separating device, and if the connection is a welded joint, the installed assembly group in accordance with the invention has the advantage that the weld seam can then extend in one plane and is not stepped.

Furthermore, when fitting together the assembly group in accordance with the invention, the correct position of the separating layer, in particular, a separating layer comprising a non-woven fibrous material, can be particularly easily ensured and checked.

A spacer (or several such spacers) defining the distance of the impact plate from the perforated plate may readily be so configured that it also forms the above-mentioned support (or rest) for the separating layer, so that the latter is unable to move downwards under the influence of the gas stream and/or its own weight during operation of the separating device.

The easiest and most cost-effective way to produce the separating device in accordance with the invention is for the perforated plate and the impact plate to be plastic injection-molded parts.

The separating device in accordance with the invention assumes particular importance where it is integrated into a valve cover for an internal combustion reciprocating piston engine and is configured as an oil mist separating device.

Further features, advantages and details of the invention will be apparent from the following description and the appended drawings of a particularly advantageous embodiment of the separating device in accordance with the invention; the drawings show in.

Figure 1:
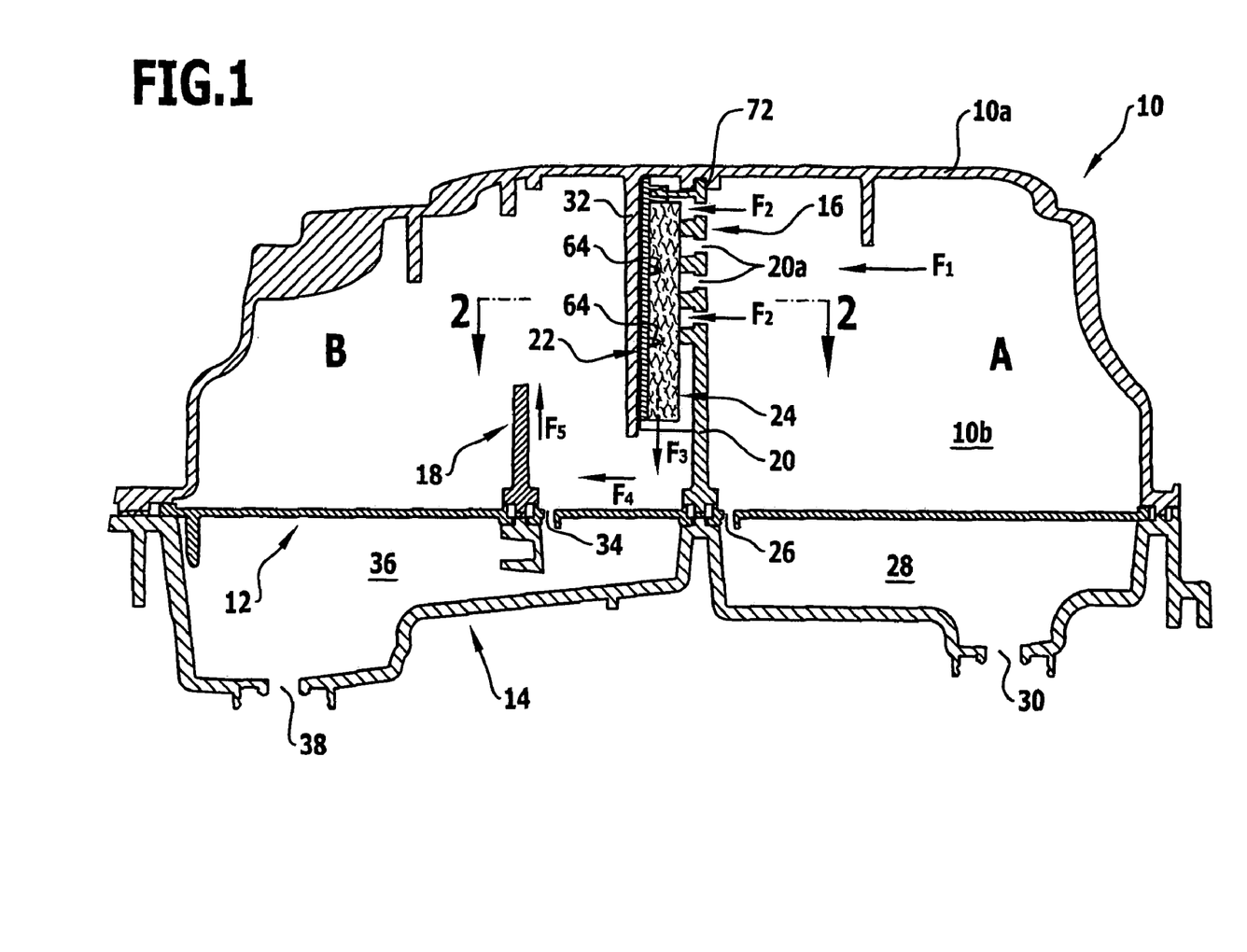
FIG. 1 a vertical longitudinal section through a region, containing the separating device in accordance with the invention, of a valve cover for an internal combustion reciprocating piston engine.

FIG. 1 shows a hood-like top part 10, a plate-like intermediate part 12 and a dish-like bottom part 14 of a valve cover. All three parts are plastic parts made of a polyamide, which are to contain reinforcement fibers, not shown.

Integrated into the valve cover in accordance with the invention is a separating device in accordance with the invention, which comprises an impactor 16 in accordance with the invention and downstream from this a second impact plate 18. The top part 10 and the intermediate part 12 together form a chamber, which is divided by the impactor 16 into an inflow chamber A and an outflow chamber B.

Blow-by gas (aerosol) entraining fine and very fine engine oil droplets—referred to hereinbelow as raw gas—flows through an opening, not shown, into the inflow chamber A and flows through it, as indicated by arrow $F_1$, essentially in a horizontal direction in accordance with FIG. 1 from the right to the left.

The impactor 16 is comprised of a perforated plate 20, a first impact plate 22 and a separating layer 24 held by the latter. The perforated plate 20 and the impact plate 22 are to be plastic injection-molded parts, in particular, made of a polyamide, while the separating layer 24 is formed by a non-woven fibrous material in the form of a flat rectangular parallelepiped. The fibers of the non-woven fibrous material are to be plastic, mineral or metal fibers which are resistant to engine oil and blow-by gases. The individual parts of the impactor 16 will be explained in greater detail hereinbelow. It should first be noted that the perforated plate 20 is provided with a plurality of holes 20a, the diameter of which is, in particular, approximately 2 mm.

The raw gas to be treated first impinges, in accordance with arrow $F_1$, on the right side, in accordance with FIG. 1, of the perforated plate 20 and, as the perforated plate also acts as impact wall, a first portion of the oil mist is separated off from the raw gas. The oil droplets formed on the right side, in accordance with FIG. 1, of the perforated plate 20 flow down the perforated plate 20, the oil then reaches the intermediate part 12 and flows down through an oil discharge opening 26, immediately adjacent to the perforated plate 20, of the intermediate part 12 into an oil collecting chamber 28 which is formed in the bottom part 14 and out of which the oil flows through a further discharge opening 30 (in practical application, a valve, not shown, is associated with the oil discharge opening 30).

There are formed by the holes 20a of the perforated plate 20 from the stream of raw gas a plurality of partial streams of raw gas with a relatively high flow velocity, which, in accordance with arrows $F_2$, impinge on the separating layer 24 and, depending on the gas-permeability of the latter, on the impact plate 22. As the impact plate 22 is gas-impermeable and, as will be shown hereinbelow, adjoins in a more or less gas-tight manner a ceiling 10a and side walls 10b of the top part 10, the stream of gas is deflected downwards, as indicated by arrow $F_3$, before the impact plate 22, i.e., on the right side, in accordance with FIG. 1, of the impact plate 22. The stream of gas is then deflected again by the intermediate part 12 (see arrow $F_4$), impinges on the second impact plate 18 and is deflected upwards by the latter (see arrow $F_5$).

There is formed on the top part 10 a support wall 32, which extends from above into the outflow chamber B, projects downwards somewhat beyond the impactor 16, but terminates at a clear distance from the intermediate part 12 above the latter. What is not apparent from FIG. 1 is the fact that the support wall 32 not only continues into the ceiling 10a of the top part 10, but also into its two side walls 10b.

The major part of the oil mist entrained by the raw gas is separated off from the stream of gas by the separating layer 24 and, depending on the gas-permeability of the latter, the impact plate 22. The oil droplets thereby formed drip down from the separating layer 24, the impact plate 22 and the support wall 32 and reach the intermediate part 12, in accordance with FIG. 1, to the left of a non-perforated lower region of the perforated plate 20. The intermediate part 12 is provided with an oil discharge opening 34 immediately before, i.e., in accordance with FIG. 1, to the right of, the impact plate 18, so that the separated oil can flow off into a second oil collecting chamber 36 formed in the bottom part 14. The oil collecting chamber 36 also has an oil discharge opening 38 corresponding to the oil discharge opening 30.

In this connection, it is to be noted that the main purpose and function of the impact plate 18 is to prevent oil dripping from the impactor 16 and the support wall 32 from being carried along again by the stream of gas, and to ensure that it flows off through the oil discharge opening 34 into the oil collecting chamber 36.

The blow-by gas, which has been at least substantially freed from the entrained engine oil, namely the clean gas, leaves the outflow chamber B through an opening, not shown, in the upper, or, in accordance with FIG. 1, left, region of the top part 10.

For the sake of completeness, it is pointed out that in the valve cover preferably used for the separating device in accordance with the invention, the top part 10, the intermediate part 12 and the bottom part 14 are welded to one another, more particularly, preferably by means of so-called hot-gas welding, which allows performance of the following procedure: First, the intermediate part 12 is placed on the bottom part 14; the cross-sectional contours, which are apparent from FIG. 1, then allow the joining surfaces that are to be joined to one another to be welded in one step after the plastic in the region of these joining surfaces has been melted by a hot gas. In this welding operation, the joining surfaces of the top part 10 and of the bottom part 14 that bear against one another and the joining surfaces of the top part 10 and of the intermediate part 12 that bear against one another are joined to one another. The cross-sectional contours apparent from FIG. 2 also allow the joining surfaces of the perforated plate 20 and the second impact plate 18, of the bottom part 14 and the intermediate part 12 that bear against one another to be welded to one another.

The individual parts of the assembly group in accordance with the invention of the separating device in accordance with the invention will first be explained with reference to FIGS. 3A, 3B, and 4.

On the side of the perforated plate 20 that faces the impact plate 22 in the preassembled assembly group in accordance with the invention, there are formed thereon rib-shaped spacer elements 50 which, in the preassembled assembly group, bear against the separating layer 24 and hold it at a defined distance from the holes 20a of the perforated plate 20. As is particularly clearly apparent from FIG. 3A, the ribs forming the spacer elements 50 have an undulating shape between the holes 20a. As mentioned above, and as is clearly apparent from FIG. 4, the separating layer 24 is formed by an element in the form of a flat parallelepiped, which preferably consists of a non-woven fibrous material. In the preferred embodiment of the assembly group in accordance with the invention, the separating layer 24 is held between the spacer elements 50 of the perforated plate 20 and the right side, in accordance with FIG. 4, of the impact plate 22, more particularly, preferably such that the separating layer 24 is slightly pressed between the impact plate 22 and the spacer elements 50 in the preassembled assembly group.

To enable easy and simple connection of the perforated plate 20 and the impact plate 22 to each other, connecting elements are formed on the sides of the perforated plate 20 and the impact plate 22 that face each other in the assembly group, which, in accordance with the invention, are so configured that the connecting elements of the one plate can be latched to the connecting elements of the other plate when the separating layer 24 is placed on the impact plate 22 and the perforated plate is then pressed against the separating layer 24 and the impact plate 22. For this purpose, the perforated plate 20 is provided at the top with a tongue-shaped connecting element 52 and at the bottom with two tongue-shaped connecting elements 54, which project from the left side, in accordance with FIG. 4, of the perforated plate 20, and, in the preferred embodiment shown, the connecting elements 54 are each formed on one of the spacer elements 50. The connecting elements 54 also form, in accordance with the invention, a support for the separating layer 24, so that it is unable to move downwards (in accordance with FIG. 4). In addition, the connecting element 52 also forms, in accordance with the invention, an abutment for the separating layer 24, so that it is also unable to move upwards in the preassembled assembly group. There is formed at the top of the impact plate 22 a connecting element 56, which is formed by two transversely extending ribs 56a and 56b, which form between them a groove into which the connecting element 52 of the perforated plate 20 is insertable. For latching the connecting elements 52 and 56 to each other, there is formed on the connecting element 52 at the front free edge thereof a projection which, in accordance with FIG. 4, projects upwards over the tongue of the connecting element 52, extends parallel to the upper edge of the perforated plate 20 and has an approximately wedge-shaped cross section. On the other hand, there is formed on the underside of the upper rib 56a of the connecting element 56 of the impact plate 22 a projection, which projects downwards from the rib 56a, is located at the free front edge of the rib 56a and extends parallel to the upper edge of the impact plate 22. When the connecting element 52 of the perforated plate 20 is inserted between the two ribs 56a and 56b, the connecting element 52 latches onto the connecting element 56 by the projection of the connecting element 52 engaging behind the projection of the rib 56a. For interacting with the two connecting elements 54 of the perforated plate 20, there are formed on the right side, in accordance with FIG. 4, of the impact plate 22 in transversely spaced relation to each other two connecting elements 58, only the front, in accordance with FIG. 4, connecting element of which is apparent from the drawings, which is to interact with the left, in accordance with FIG. 3A, connecting element 54 of the perforated plate 20. Each of the two connecting elements 58 is of approximately the same configuration as the connecting element 56 of the impact plate 22, but is arranged at 90° to the connecting element 56. Like the connecting element 52, each of the two connecting elements 54 also has at its front end a projection which engages behind a projection of the associated connecting element 58 in the preassembled assembly group in accordance with the invention.

In accordance with the invention, the support wall 32 held by the top part 10 of the valve cover also forms a securing element for holding together the impactor 16. For this purpose, the support wall 32 bears against the installed impactor 16, more particularly, in the preferred embodiment, against the impact plate 22. In this way, it is ensured that the parts forming the impactor 16, in particular, the perforated plate 20 and the impact plate 22, cannot become detached from one another when the separating device is in operation.

In accordance with the invention, the connecting elements 52, 54, 56 and 58 also serve to hold the perforated plate 20 and the impact plate 22 at a defined distance from each other in the preassembled assembly group.

Figure 3A:
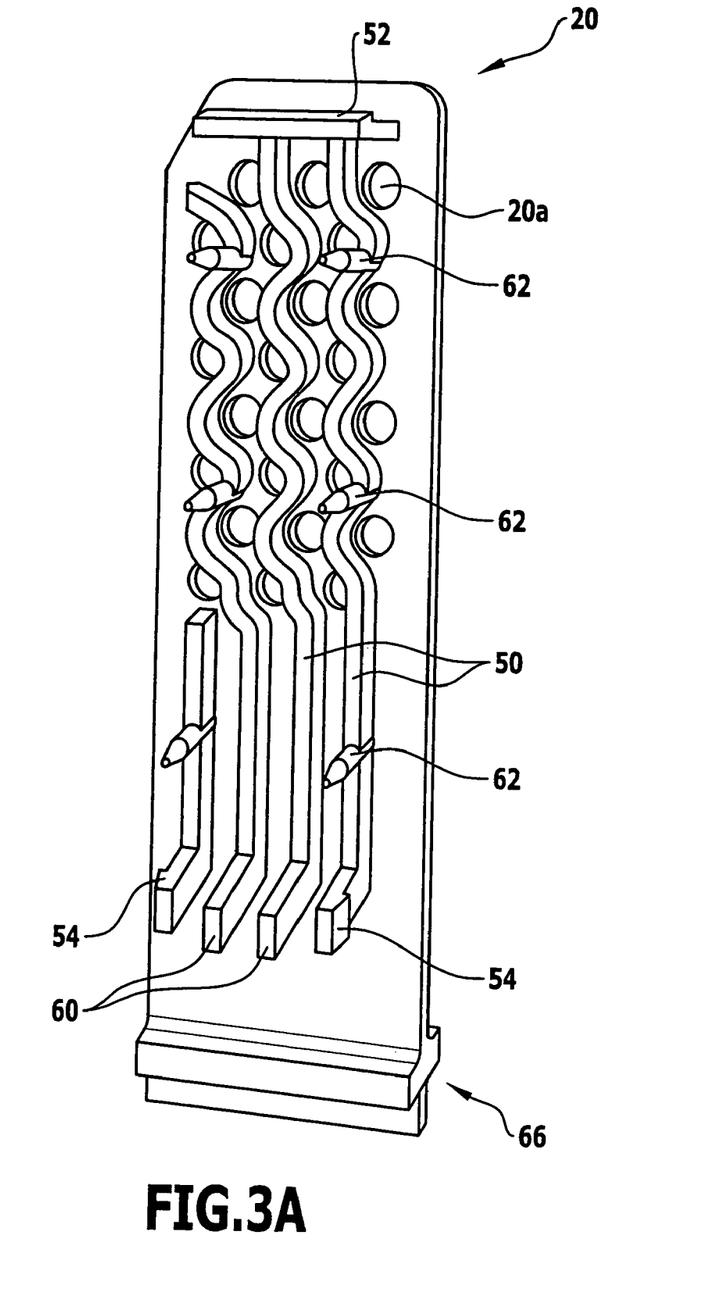
FIG. 3A the perforated plate of the separating device in an isometric representation, more particularly, seen from the left in accordance with FIG. 1.
Figure 4:
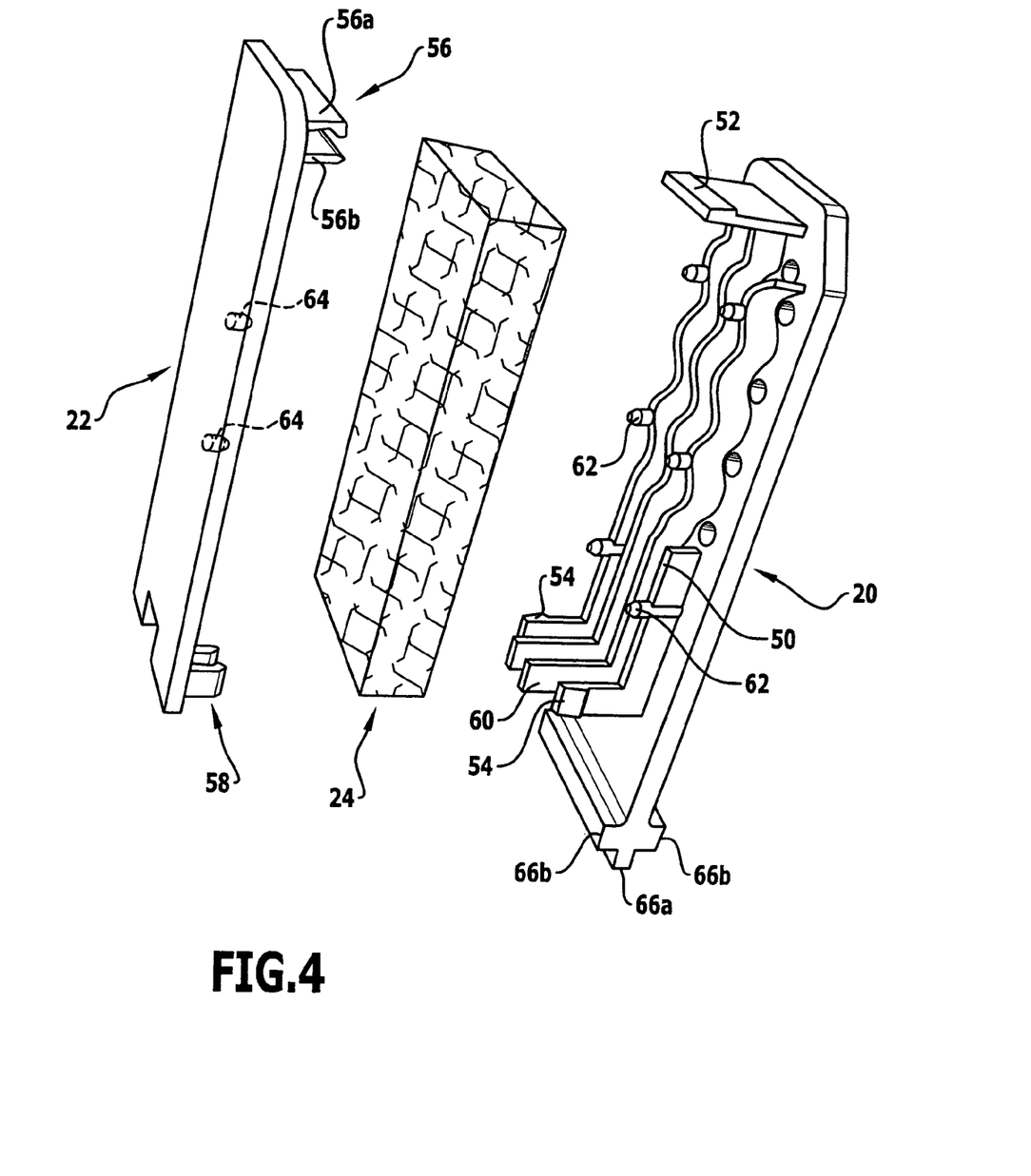
FIG. 4 an isometric representation of the assembly group in accordance with the invention comprising perforated plate, impact plate and separating layer, more particularly, in the manner of an exploded drawing, before the parts of the assembly group are fitted together.

In the preferred embodiment shown in the drawings, the perforated plate 20 is provided with spacers 60, which project like tongues from the front, in accordance with FIG. 3A, side of the perforated plate 20, bear against the right side, in accordance with FIG. 4, of the impact plate 22 in the preassembled assembly group, and, above all, like the connecting elements 54, form a support for the separating layer 24. Furthermore, in the embodiment shown, the two spacers 60 continue into the two central rib-shaped spacer elements 50 of the perforated plate 20.

As will be apparent from FIGS. 3A and 4, and also from FIG. 1, the perforated plate 20 and the impact plate 22 are provided with fixing elements for the separating layer 24, more particularly, with fixing elements in the form of fixing pins 62 and 64, which are formed on the perforated plate 20 and the impact plate 22, respectively, and when preassembling the assembly group, penetrate into the separating layer 24 and/or cause elastic and/or plastic deformation of the side of the separating layer that faces the perforated plate and the impact plate, respectively.

Owing to the fixing elements, the separating layer 24 which, in accordance with the invention, is only inserted, is unable to move. The fixing pins 62 of the perforated plate 20 may, however, also serve as spacer elements, which prevent the separating layer 24 from bearing against the perforated plate 20, so that the rib-shaped spacer elements 50 of the perforated plate 20 are not absolutely necessary.

Finally, for its positioning and fixing on or at the intermediate part 12 and the bottom part 14 of the valve cover, the perforated plate 20 has at the bottom a foot region 66, having an approximately T-shaped cross section with a downwardly projecting connecting rib 66a and two transversely protruding connecting ribs 66b. As will be apparent from FIG. 1, the connecting rib 66a serves to weld the perforated plate 20 to the bottom part 14, while the connecting ribs 66b serve to weld the perforated plate 20 to the intermediate part 12.

Figure 2:
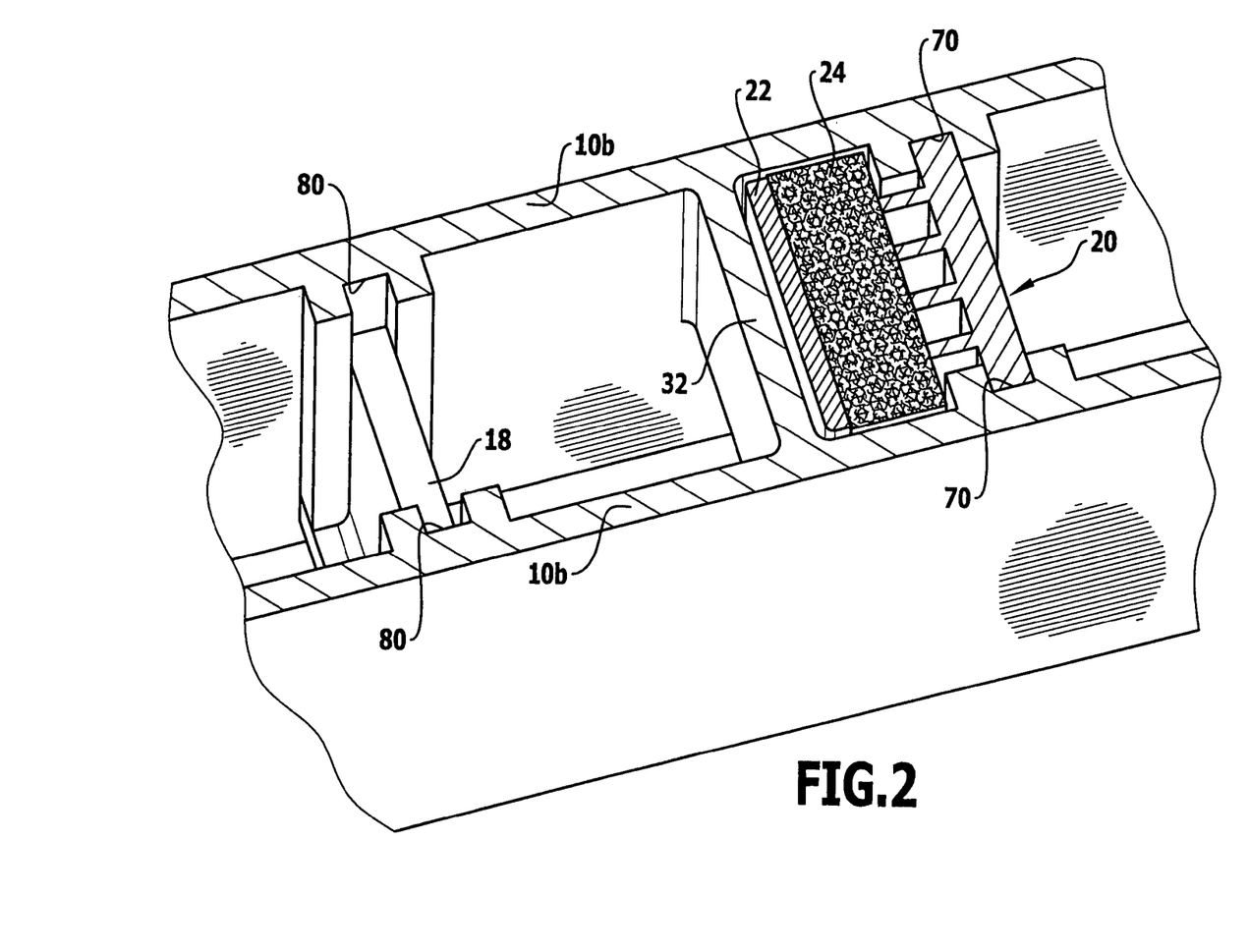
FIG. 2 a horizontal section through part of this valve cover region in accordance with line 2-2 in FIG. 1.
Figure 3B:
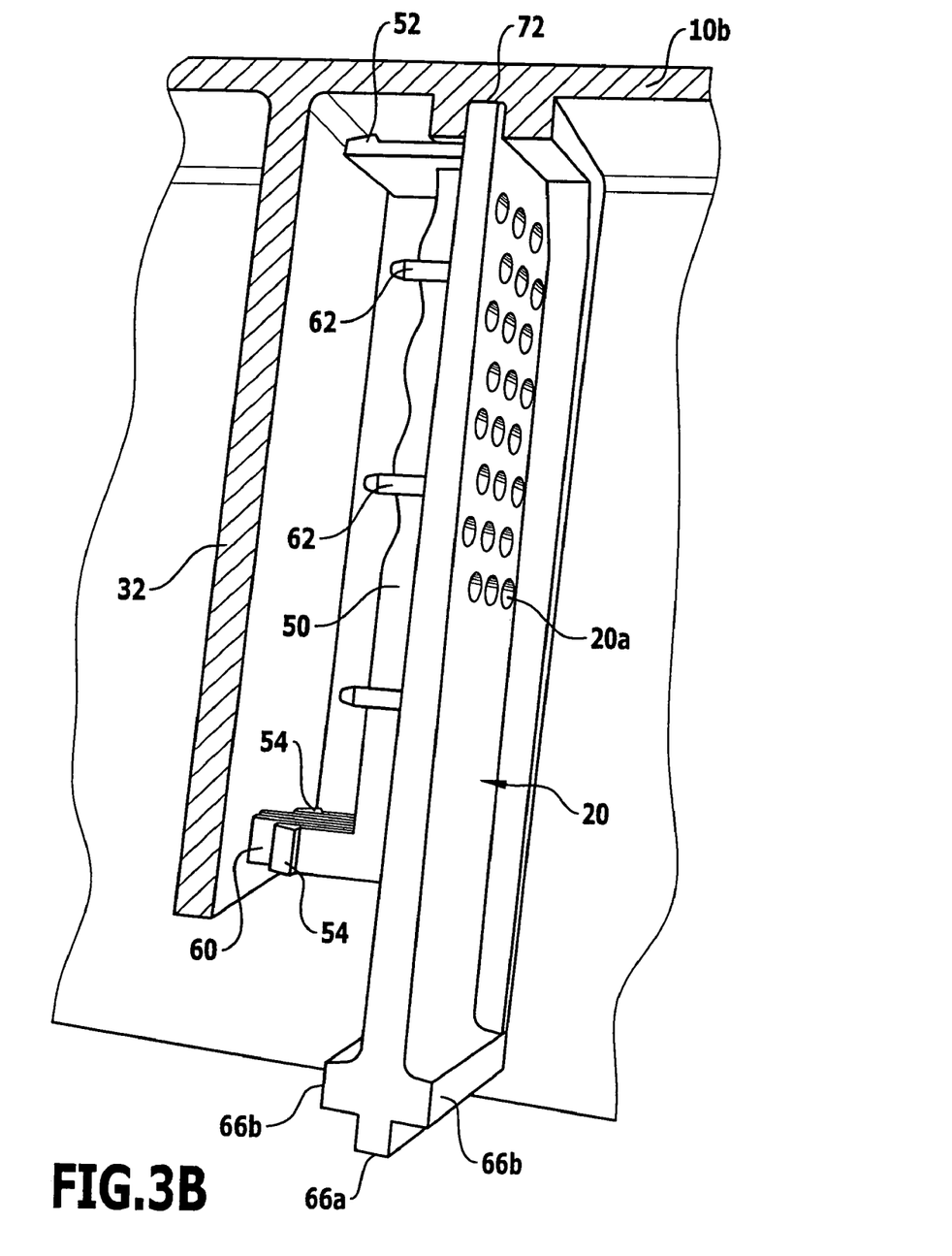
FIG. 3B an isometric representation of the perforated plate in accordance with FIG. 1 seen from the front, more particularly, including a region, which guides and holds the perforated plate, of a top part of the valve cover shown in FIG. 1.

FIGS. 1, 2 and 3B finally show how the preassembled assembly group in accordance with the invention can be inserted from below into the top part 10 of the valve cover and is held in this top part.

FIG. 2 shows the two side walls 10b of the valve cover top part 10, which, at least in areas thereof, extend in transversely spaced parallel relation to each other. FIG. 2 also shows the support wall 32, which continues into the two side walls 10b. To insert the preassembled assembly group in accordance with the invention comprised of perforated plate 20, impact plate 22 and separating layer 24 into the valve cover top part 10 from below, there are formed on the inner sides of the two side walls 10b vertically extending guiding and retaining grooves 70 into which the longitudinal side edges of the perforated plate 20 can be fitted from below. Furthermore, the under or inner side of the ceiling 10a of the top part 10 is provided with a retaining groove 72 into which the upper edge of the perforated plate 20 fits after the perforated plate has been inserted into the valve cover top part 10 until it comes to rest against the ceiling 10a.

Figure 5:
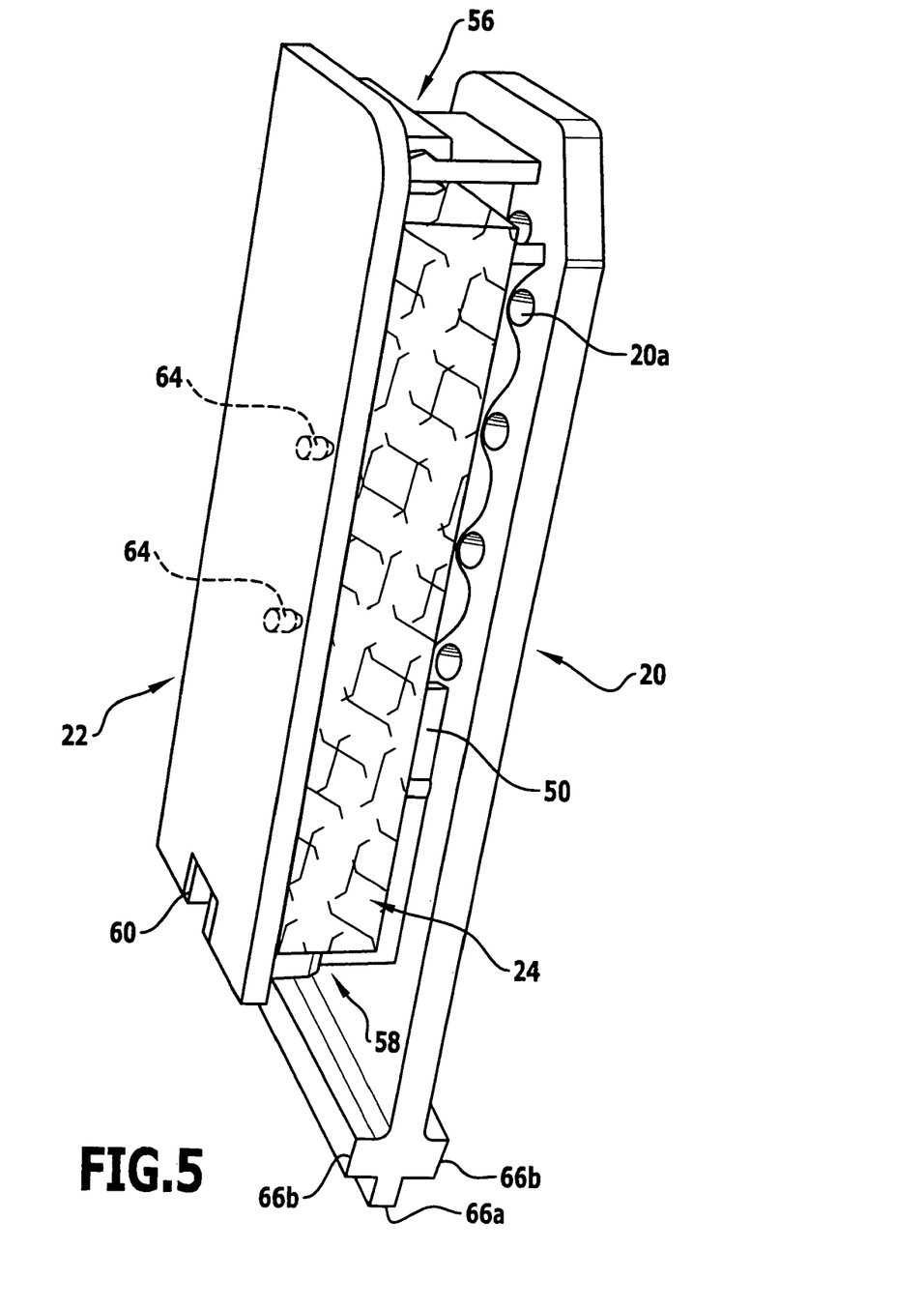
FIG. 5 an isometric representation of the assembly group in accordance with the invention, which has been pre-assembled, i.e., fitted together.

FIG. 5 shows the assembly group in accordance with the invention consisting of perforated plate 20, impact plate 22 and separating layer 24 in the preassembled state, in which the two plates are latched to each other.

Finally, the two side walls 10b of the valve cover top part 10 are provided on their inner sides with vertically extending retaining grooves 80 lying opposite each other, into which the second impact plate 18 can be fitted from below, and which serve to retain this impact plate.

As will be particularly clearly apparent from FIG. 2, the rib-shaped spacer elements 50 also have the advantage that the gas flowing through the holes 20a of the perforated plate 20 into the space between the latter and the impact plate 22 is still able to form in this space a defined bypass volume flow and to flow out of the space when the separating layer 24 has become more or less gas-impermeable as a result of soiling that has occurred during operation.

Finally, at this juncture it will be pointed out again that the retaining grooves 70 and 72 form together with the upper edge and the two side edges of the perforated plate 20 labyrinth seals, which are not absolutely gas-tight, but do prevent the passage of significant gas volumes when the separating device is in operation. The same applies to the foot region 66 of the perforated plate 20 in conjunction with the cross-sectional contours, apparent from FIG. 1, of the intermediate part 12 and the bottom part 14, more particularly, in the event that the foot region 66 of the perforated plate 20 is welded neither to the intermediate part 12 nor to the bottom part 14 of the valve cover.

The invention claimed is:

1. Separating device for separating liquid or solid particles from an aerosol gas stream, which comprises an impactor, which has a perforated plate adapted for the aerosol to flow against it, and an impact plate which extends approximately parallel to the perforated plate and is arranged at a distance behind the perforated plate in the flow direction, the side of the impact plate that faces the perforated plate comprising a separating layer with an open structure;

wherein the perforated plate is provided on its side that faces the impact plate with a plurality of spacer elements bearing against the region, against which the aerosol stream flows, of the side of the separating layer that faces the perforated plate;

wherein the impact plate is at least substantially gas-impermeable in the flow direction of the aerosol stream, at least in its region lying in this direction behind said region of the separating layer;

wherein the height of the spacer elements measured in the flow direction, the support surfaces formed by the spacer elements for the separating layer, and the number and arrangement of the spacer elements are selected in dependence upon the material of the separating layer such that it is ensured that the holes of the perforated plate remain free from material of the separating layer also during operation of the separating device, and the separating layer is held by the spacer elements at such a distance from the perforated plate that flow paths for the gas stream result between the perforated plate and the separating layer, which run approximately parallel to the perforated plate; and wherein the impactor comprises elements in the form of a plurality of projections as fixing elements provided on at least one of the perforated plate and the impact plate, protruding from this and penetrating into the separating layer for preventing displacement of the separating layer inserted between the perforated plate and the impact plate in the flow-through direction of the flow paths.

2. Separating device in accordance with claim 1, wherein the separating layer is compressible transversely to the impact plate.

3. Separating device in accordance with claim 1, wherein the separating layer is a covering, produced as a separate part, on the impact plate.

4. Separating device in accordance with claim 1, wherein the separating layer comprises a non-woven fibrous material.

5. Separating device in accordance with claim 1, wherein at least one spacer element is configured as a pin, spike or web projecting from the perforated plate.

6. Separating device in accordance with claim 1, wherein the perforated plate is provided on its side that faces the impact plate with ribs forming spacer elements and having holes of the perforated plate arranged between them.

7. Separating device in accordance with claim 6, wherein in a plan view of the side of the perforated plate that faces the impact plate, the ribs between the holes are of undulating configuration.

8. Separating device in accordance with claim 1, wherein the separating layer is inserted between the perforated plate and the impact plate, and the impactor comprises for the separating layer a support for an edge of the separating layer, which prevents displacement of the separating layer in the flow-through direction of the flow paths, and wherein the support is gas-permeable in the flow-through direction of the flow paths.

9. Separating device in accordance with claim 1, wherein the perforated plate and the impact plate are configured as separately produced parts and are connected to each other by connecting elements to form an assembly group for installation as a unit.

10. Separating device in accordance with claim 1, wherein the separating device is configured for such installation that the plates extend in the vertical direction or form an acute angle with the vertical.

11. Separating device in accordance with claim 10, wherein the perforated plate projects downwards beyond the impact plate.

12. Separating device in accordance with claim 9, wherein the connecting elements are configured as latching elements arranged on the two plates.

13. Separating device in accordance with claim 1, wherein there is arranged on at least one of the impact plate and the perforated plate at least one spacer which interacts with the other plate and holds the two plates at a distance from each other.

14. Separating device in accordance with claim 9, wherein there is arranged on at least one of the impact plate and the perforated plate at least one spacer which interacts with the other plate and holds the two plates at a distance from each other, and wherein the connecting elements also form the spacer.

15. Separating device in accordance with claim 9, wherein the connecting elements are so configured that the gas stream of the aerosol can flow out of the space between perforated plate and separating layer.

16. Separating device in accordance with claim 1, wherein the perforated plate is provided in its lower region with an attachment section.

17. Separating device in accordance with claim 1, wherein at least one of the perforated plate and the impact plate comprises lateral guiding and retaining edges for inserting the assembly group into guides of a housing part of a housing serving to receive the separating device.

18. Separating device in accordance with claim 1, wherein at least the perforated plate comprises an upper retaining edge for engagement between holding elements of a housing part of a housing serving to receive the separating device.

19. Separating device in accordance with claim 1, wherein at least the perforated plate comprises a lower retaining edge for engagement between holding elements of a housing part of a housing serving to receive the separating device.

20. Separating device in accordance with claim 17, wherein the edges of the perforated plate and the regions of the housing interacting with these form labyrinth seals.

21. Separating device in accordance with claim 18, wherein the edge of the perforated plate and the regions of the housing interacting with these form labyrinth seals.

22. Separating device in accordance with claim 19, wherein the edge of the perforated plate and the regions of the housing interacting with these form labyrinth seals.

23. Separating device in accordance with claim 1, wherein the perforated plate and the impact plate are configured as plastic injection-molded parts.

24. Separating device in accordance with claim 1, wherein the separating device is integrated into a valve cover for an internal combustion reciprocating piston engine and is configured as an oil mist separating device.

* * * * *